(12) United States Patent
Du

(10) Patent No.: US 9,939,988 B2
(45) Date of Patent: Apr. 10, 2018

(54) METHOD AND USER EQUIPMENT FOR MANAGING APPLICATION PROGRAMS

(71) Applicant: Tencent Technology (Shenzhen) Company Limited, Shenzhen (CN)

(72) Inventor: Lei Du, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 246 days.

(21) Appl. No.: 14/626,661

(22) Filed: Feb. 19, 2015

(65) Prior Publication Data
US 2015/0160829 A1 Jun. 11, 2015

Related U.S. Application Data

(63) Continuation of application No. PCT/CN2013/080094, filed on Jul. 25, 2013.

(30) Foreign Application Priority Data

Aug. 22, 2012 (CN) .......................... 2012 1 0299261

(51) Int. Cl.
*G06F 3/0481* (2013.01)
*G06F 3/0488* (2013.01)
(Continued)

(52) U.S. Cl.
CPC ........ *G06F 3/04817* (2013.01); *G06F 3/0482* (2013.01); *G06F 3/0486* (2013.01); *G06F 3/0488* (2013.01)

(58) Field of Classification Search
CPC ..... G06F 3/0481; G06F 3/0486; G06F 3/0482
See application file for complete search history.

(56) References Cited

U.S. PATENT DOCUMENTS 5,760,774 A * 6/1998 Grossman ............. G06F 3/0481
715/835
6,971,018 B1 * 11/2005 Witt ....................... G06F 21/52
705/57
(Continued)

FOREIGN PATENT DOCUMENTS

CN 101627359 A 1/2010
CN 101796478 A 8/2010
(Continued)

OTHER PUBLICATIONS

Samsung galaxy tab—Jul. 27, 2011.*
(Continued)

*Primary Examiner* — David Choi
(74) *Attorney, Agent, or Firm* — Morgan, Lewis & Bockius LLP

(57) ABSTRACT

The present invention provides a method and a user device for managing application. The method includes: detecting the touch event which induced by a user touching icons displayed in a display interface; determining the area of the display interface which the first icon located in, when the touch event corresponding to the first icon is detected and the detected touch event persists a scheduled time; displaying a second icon in the determined area; detecting the movement path which induced by the user dragging the first icon through the application corresponding to the second icon, when the first icon moves into the location of the second icon. The distance of moving the first icon will not be very long and easy to operate, when the first icon is moved into the location of the second icon and the application corresponding to the first icon is deleted.

15 Claims, 6 Drawing Sheets

(51) Int. Cl.
   G06F 3/0486       (2013.01)
   G06F 3/0482       (2013.01)

(56) References Cited

U.S. PATENT DOCUMENTS

| | | | |
|---|---|---|---|
| 2004/0225690 A1* | 11/2004 | Arkeketa | G06F 21/604 |
| 2004/0225877 A1* | 11/2004 | Huang | G06F 21/552 |
| | | | 713/100 |
| 2006/0117301 A1* | 6/2006 | Saunders | G06Q 50/02 |
| | | | 717/124 |
| 2009/0093277 A1 | 4/2009 | Lee et al. | |
| 2010/0050076 A1* | 2/2010 | Roth | G06F 3/04883 |
| | | | 715/702 |
| 2012/0185789 A1* | 7/2012 | Louch | G06F 3/0488 |
| | | | 715/769 |
| 2015/0160829 A1* | 6/2015 | Du | G06F 3/04817 |
| | | | 715/765 |

FOREIGN PATENT DOCUMENTS

| | | | |
|---|---|---|---|
| CN | 102073449 A | 5/2011 | |
| CN | 102314305 A | 1/2012 | |
| CN | 102455930 A | 5/2012 | |
| CN | 102622270 A | 8/2012 | |
| KR | 2012039997 A | 4/2012 | |

OTHER PUBLICATIONS

PCT Search Report for PCT/CN2013/080094, dated Nov. 11, 2013.
First Office Action and Search Report for application No. 201210299261.9 dated Apr. 1, 2017.

* cited by examiner

METHOD AND USER EQUIPMENT FOR MANAGING APPLICATION PROGRAMS

CROSS-REFERENCE TO RELATED APPLICATIONS

This application is a U.S. continuation application under 35 U.S.C. § 111(a) claiming priority under 35 U.S.C. §§ 120 and 365(c) to International Application No. PCT/CN2013/080094 filed on Jul. 25, 2013, which claims the priority benefit of Chinese Patent Application No. 201210299261.9 filed on Aug. 22, 2012, the contents of which are incorporated by reference herein in their entirety for all intended purposes.

FIELD OF THE INVENTION

The disclosure relates to a technical field for processing application programs, in particular, to a method and user equipment for managing application programs.

BACKGROUND

As the development of software technology, more and more application programs are developed and employed, which enrich and facilitate people's life and work. Usually, a user may select and download a required application program from an application program store or search and download the application program in the web, and then install the downloaded application program into the use equipment. The user may also delete an unwanted application program from the user's user equipment (UE) so that there is enough space for receiving new application programs.

In the prior art, the application program may be deleted according to the following method. When the user long-presses an icon of an application program to be deleted, an icon of a waste bin is displayed in the top or bottom of the display screen. When the user drags the application program into the waste bin, a confirmation message for deletion is popped up. When information for confirming the deletion is received from the user, the application program is deleted.

In the process for implementing this invention, the inventor has noticed at least the following problem in the prior art. For a UE with a screen of 4.3 or larger inches, in the process for deleting the application program by dragging the icon of the application program to the waste bin displayed in the top or bottom of the screen, if the icon of the application program is located in the bottom or top of the screen, the dragging distance is long. In particular, when the user operates by a single hand, the long distance dragging operation is difficult.

SUMMARY OF THE INVENTION

In order to solve the problem in the prior art, a method for embodiments of managing application programs and a UE for implementing the method are provided in the disclosure.

In an aspect, a method for managing an application program is provided in an embodiment of the invention. The method comprises:

monitoring a touch event generated when a user touches an icon displayed in a displaying interface;

determining an area of the first icon in the displaying interface when a touch event corresponding to a first icon is monitored and the monitored event lasts for a predetermined period;

displaying a second icon in the determined area;

monitoring a moving trace generated when the user drags the first icon and controlling the first icon to move along the moving trace; and deleting the application program corresponding to the first icon by using the application program corresponding to the second icon when the first icon moves to a position of the second icon.

In an embodiment, determining an area of the first icon in the displaying interface comprises:

reading out position information of the first icon in the display interface;

determining a coordinate of a center of the first icon according to the position information;

searching corresponding relationship between areas in the display interface and coordinate intervals according to the determined coordinate of the center of the first icon so as to obtain an area in which the coordinate is located, the searched out area being the area of the display interface in which the first icon is located.

In an embodiment, deleting the application program corresponding to the first icon by using the application program corresponding to the second icon comprises:

determining whether the application program corresponding to the first icon is a third party application program or a local system program;

deleting the application program corresponding to the first icon by the application program corresponding to the second icon when the application program corresponding to the first icon is a third party application program;

preventing deleting the application program corresponding to the first icon by the application program corresponding to the second icon and providing a prompt to the user when the application program corresponding to the first icon is a local system program.

In an embodiment, determining whether the application program corresponding to the first icon is a third party application program or a local system program comprises:

reading out an amending authority for the application program corresponding to the first icon, determining that the application program corresponding to the first icon is a third party application program if the amending authority indicates that it is allowed to amend the application program corresponding to the first icon, and determining that the application program corresponding to the first icon is a local system program if the amending authority indicates that it is not allowed to amend the application program corresponding to the first icon; or searching a local system program catalogue according to the application program corresponding to the first icon, determining that the application program corresponding to the first icon is a third party application program if the local system program catalogue does not include the application program corresponding to the first icon, and determining that the application program corresponding to the first icon is a local system program if the local system program catalogue includes the application program corresponding to the first icon.

In an embodiment, deleting the application program corresponding to the first icon by using the application program corresponding to the second icon comprises:

locally deleting the application program corresponding to the first icon by the application program corresponding to the second icon; or isolating the application program corresponding to the first icon into the application program corresponding to the second icon.

In another aspect, a user equipment comprising a first monitoring module, a determining module, a controlled displaying module, a second monitoring module and a deleting module is provided in an embodiment of the invention, in which:

the first monitoring module is configured to monitor a touch event generated when a user touches an icon displayed on a displaying interface;

the determining module is configured to determine an area of the first icon in the displaying interface when a touch event corresponding to a first icon is monitored and the monitored event lasts for a predetermined period;

the controlled displaying module is configured to display a second icon in the determined area;

the second monitoring module is configured to monitor a moving trace generated when the user drags the first icon and control the first icon to move along the moving trace;

the deleting module is configured to delete the application program corresponding to the first icon by using the application program corresponding to the second icon when the first icon moves to a position of the second icon.

In an embodiment, the determining module comprises:
a reading unit configured to read out position information of the first icon in the display interface;
a determining unit configured to determine a coordinate of a center of the first icon according to the position information;
a searching unit configured to search corresponding relationship between areas in the display interface and coordinate intervals according to the determined coordinate of the center of the first icon so as to obtain an area in which the coordinate is located, the searched out area being the area of the display interface in which the first icon is located.

In an embodiment, the deleting module comprises:
a determining unit configured to determine whether the application program corresponding to the first icon is a third party application program or a local system program;
a first processing unit configured to delete the application program corresponding to the first icon by the application program corresponding to the second icon when the application program corresponding to the first icon is a third party application program;
a second processing unit configured to prevent deleting the application program corresponding to the first icon by the application program corresponding to the second icon and provide a prompt to the user when the application program corresponding to the first icon is a local system program.

In an embodiment, the determining unit is configured to read out an amending authority for the application program corresponding to the first icon, determine that the application program corresponding to the first icon is a third party application program if the amending authority indicates that it is allowed to amend the application program corresponding to the first icon, and determine that the application program corresponding to the first icon is a local system program if the amending authority indicates that it is not allowed to amend the application program corresponding to the first icon; or the determining unit is configured to search a local system program catalogue according to the application program corresponding to the first icon, determine that the application program corresponding to the first icon is a third party application program if the local system program catalogue does not include the application program corresponding to the first icon, and determine that the application program corresponding to the first icon is a local system program if the local system program catalogue includes the application program corresponding to the first icon.

In an embodiment, the first processing unit is configured to locally delete the application program corresponding to the first icon by the application program corresponding to the second icon; or the first processing unit is configured to isolate the application program corresponding to the first icon into the application program corresponding to the second icon.

Technical solutions of embodiments of the invention bring the following advantages. The area of the first icon in the displaying interface is determined, the second icon is displayed in the determined area, and the application program corresponding to the first icon is deleted by using the application program corresponding to the second icon when the first icon moves to the position of the second icon. Since the first icon and the second icon are displayed in the same area, the distance for moving the first icon to the position of the second icon so as to delete the application program corresponding to the first application will not be too long for operation.

DESCRIPTION OF THE DRAWINGS

In order to illustrate technical solutions of embodiments of the disclosure more clearly, drawings used in the embodiments are briefly described below. It is obvious that the drawings described below are only some embodiments of the invention. For a skilled in the art, other drawings may be obtained without paying any inventive work based on these drawings.

DETAILED DESCRIPTION

In order to make the objects, technical solutions and advantages of the invention more apparent, the invention will be further illustrated in details in connection with accompanying figures and embodiments hereinafter.

Embodiment I

Figure 1:
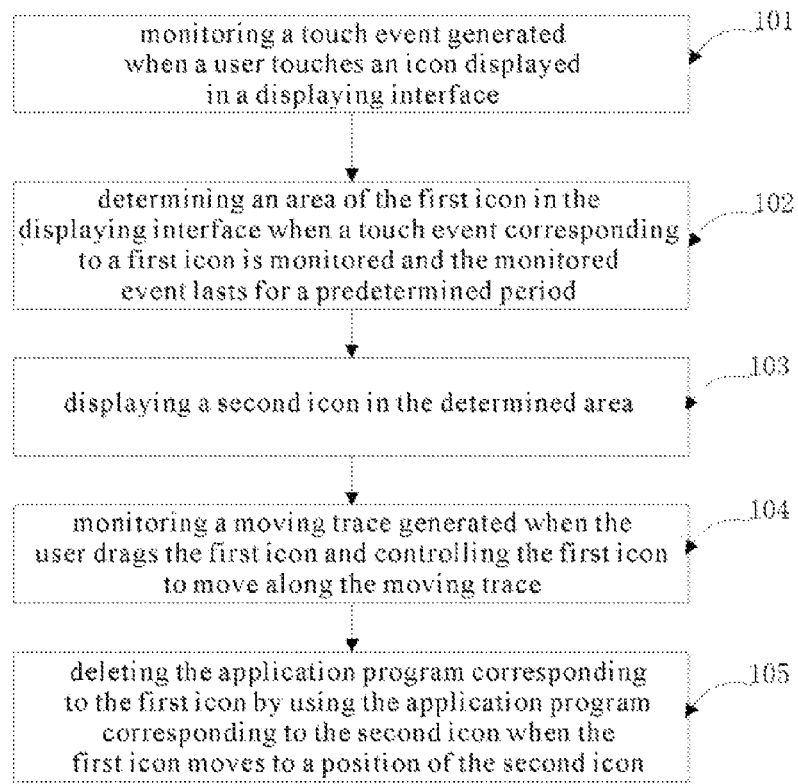
FIG. 1 is a flow diagram showing a method for managing an application program according to a first embodiment of the invention.

Referring to FIG. 1, a method for managing an application program comprises the following steps.

At step 101, a touch event generated when a user touches an icon displayed on a displaying interface is monitored.

At step 102, when a touch event corresponding to a first icon is monitored and the monitored event lasts for a predetermined period, an area of the first icon in the displaying interface is determined.

At step 103, a second icon is displayed in the determined area.

At step 104, a moving trace generated when the user drags the first icon is monitored, and the first icon is controlled to move along the moving trace.

At step 105, when the first icon moves to a position of the second icon, the application program corresponding to the first icon is deleted by using the application program corresponding to the second icon.

In this embodiment, the area of the first icon in the displaying interface is determined, the second icon is displayed in the determined area, and the application program corresponding to the first icon is deleted by using the application program corresponding to the second icon when the first icon moves to the position of the second icon. Since the first icon and the second icon are displayed in the same area, the distance for moving the first icon to the position of the second icon so as to delete the application program corresponding to the first application will not be too long for operation.

Embodiment II

Figure 2:
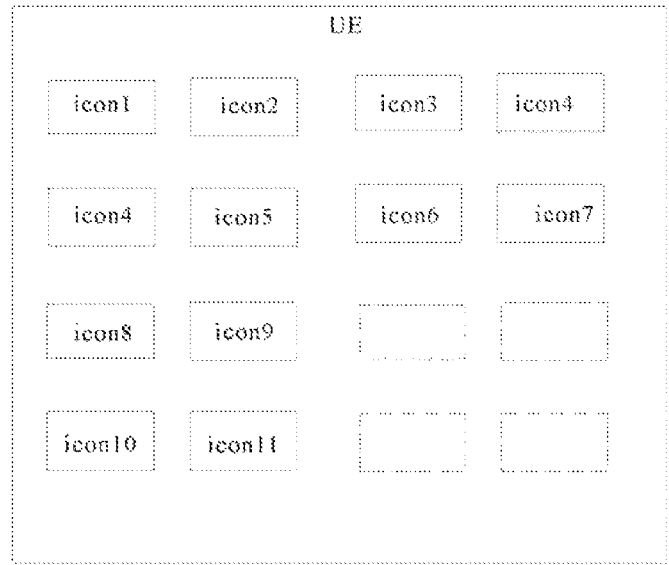
FIG. 2 is a diagram showing a displaying interface of a UE according to a second embodiment of the invention.

In this embodiment, the display interface of the UE is divided into a plurality of grids. After the UE executes an install program of the application program and finishes installation of the application program, an unoccupied grid among currently unoccupied grids in the display interface is sequentially selected and an icon corresponding to the application program is displayed in the selected grid. According to the embodiment, a position of the grid occupied by the icon may be used as a display position of the icon, and position information of the icon corresponding to each application program in the display interface is recorded. In particular, FIG. 2 shows a display interface of a UE according to the embodiment, which is divided into 16 grids each corresponding to an icon of an application program installed in the UE. Dashed boxes in FIG. 2 are unoccupied grids in the display interface.

In this embodiment, the display interface of the UE may be a touch screen so that the user may delete the application program by touching the icon of the application program displayed in the touch screen.

Figure 3:
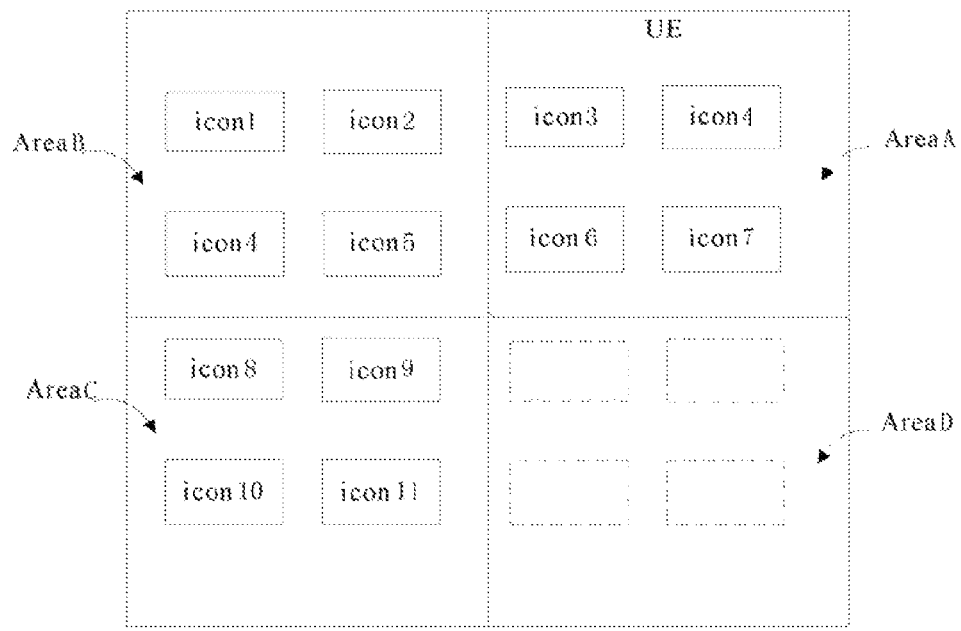
FIG. 3 is a diagram showing an area division of the displaying interface of the UE according to the second embodiment of the invention.
Figure 4:
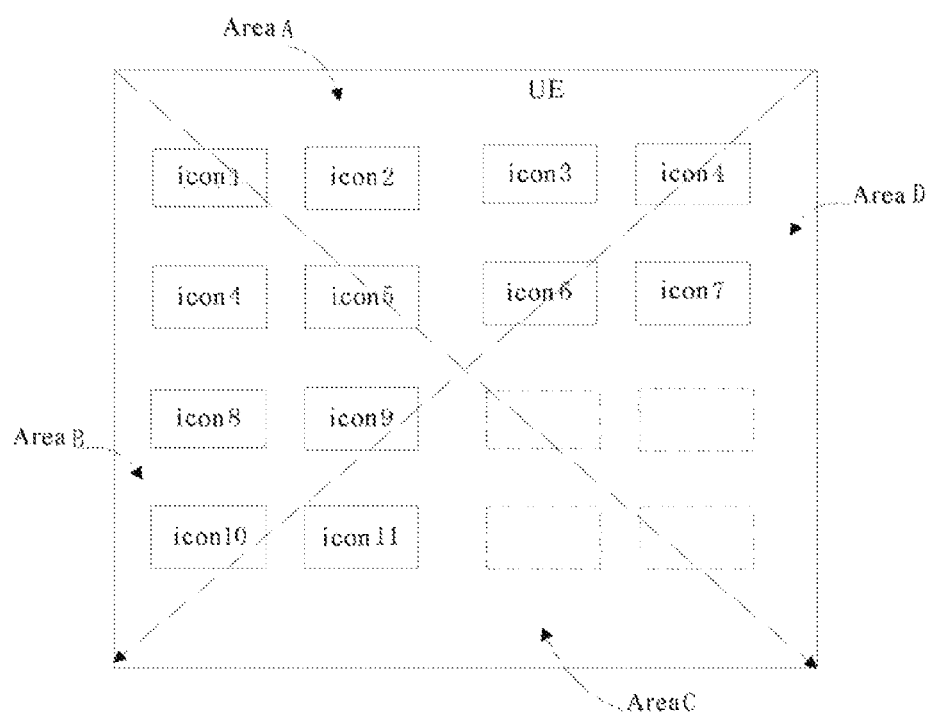
FIG. 4 is a diagram showing an area division of the displaying interface of the UE according to the second embodiment of the invention.

In the embodiment, the display interface of the UE may be previously divided into areas so that the user may delete the application program conveniently. In particular, the display interface of the UE may be equally divided into a plurality of areas, for example, as shown in FIG. 3 or FIG. 4 in both of which the display interface is divided into four areas A, B, C and D. Accordingly, when the user operates the icon of the application program displayed in the touch screen to delete the operated application program, a newly added icon for deletion may be created and displayed in the area in which the icon of the operated application program is located. The icon for deletion corresponds to an application program for deleting an application program. Thereafter, the user may drag the icon of the application program to the icon for deletion within the same area for deleting the application program. The distance for dragging the icon of the application program to be deleted is reduced, which facilitates the operation.

Figure 5:
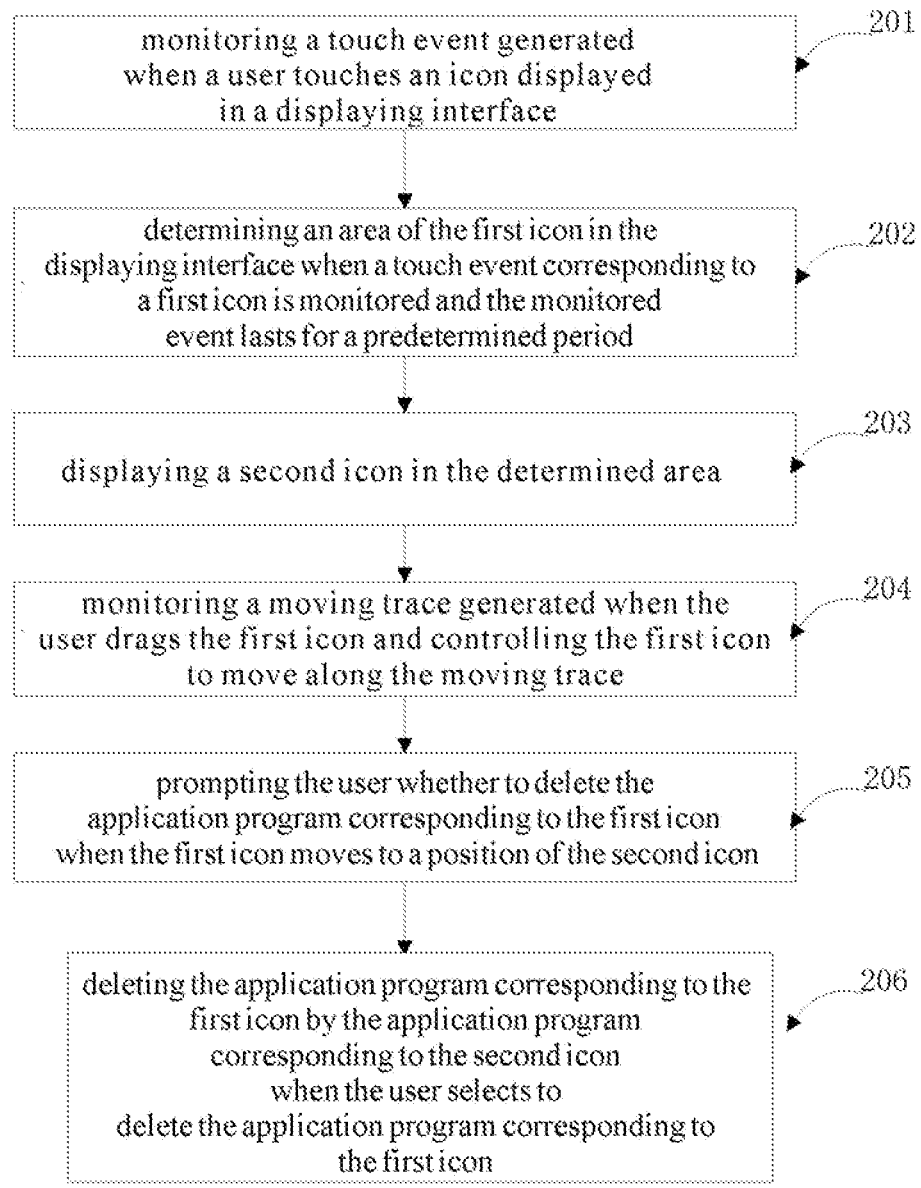
FIG. 5 is a flow diagram showing a method for managing an application program according to the second embodiment of the invention.

Based on the above description, a method for managing the application program is provided in the embodiment. The method may be implemented by the UE. As shown in FIG. 5, the method comprises the following steps.

At step 201, a touch event generated when a user touches an icon displayed on a displaying interface is monitored.

In the embodiment, when the user touches an icon displayed on a displaying interface in a screen of a terminal, a touch event is generated. In specific implementation, the touch event generated when the user touches the icon displayed in the display interface may be monitored by a preset application program programmed with JavaScript scripting language or a controller in the UE.

At step 202, when a touch event corresponding to a first icon is monitored and the monitored event lasts for a predetermined period, an area of the first icon in the displaying interface is determined. In the embodiment, the predetermined period may be set by software or an operator as 1 s, 2 s or the like, which is not limited herein.

In particular, the area of the first icon in the displaying interface may be determined as follows.

Firstly, position information of the first icon in the display interface is read out.

In the embodiment, the position information of the icon corresponding to the application program is recorded when the application program is installed and executed and the icon of the application program is displayed in a grid divided in the display interface so that the position information of the first icon, such as (2, 3) to (3, 3), is read out from the system when a touch event to the first icon is monitored.

The coordinate of the center of the first icon is determined according to the position information. In particular, the central point of the read out position information may be used as the coordinate of the center of the first icon. For example, the central point (2.5, 2.5) of the read out position information (2, 3) to (3, 3) may be used as the coordinate of the center of the first icon.

According to the determined coordinate of the center of the first icon, an area in which the coordinate is located is obtained by searching corresponding relationship between areas in the display interface and the coordinate intervals. The searched out area is the area in the display interface in which the first icon located.

Specifically, a corresponding relationship between the areas and the coordinate intervals may be listed in Table I.

| areas | coordinate intervals |
|---|---|
| A | (0, 0) to (−3, 3) |
| B | (0, 0) to (3, 3) |
| C | (0, 0) to (−3, −3) |
| D | (0, 0) to (3, −3) |

When the coordinate of the center of the first icon, such as (2.5, 2.5), is determined, the corresponding relationship between the areas and the coordinate intervals as shown in Table I, and it is determined that the coordinate (2.5, 2.5) is located in the area B. Thus, it is known that the first icon is located in the area B of the display interface.

At step 203, a second icon is displayed in the determined area.

Figure 6:
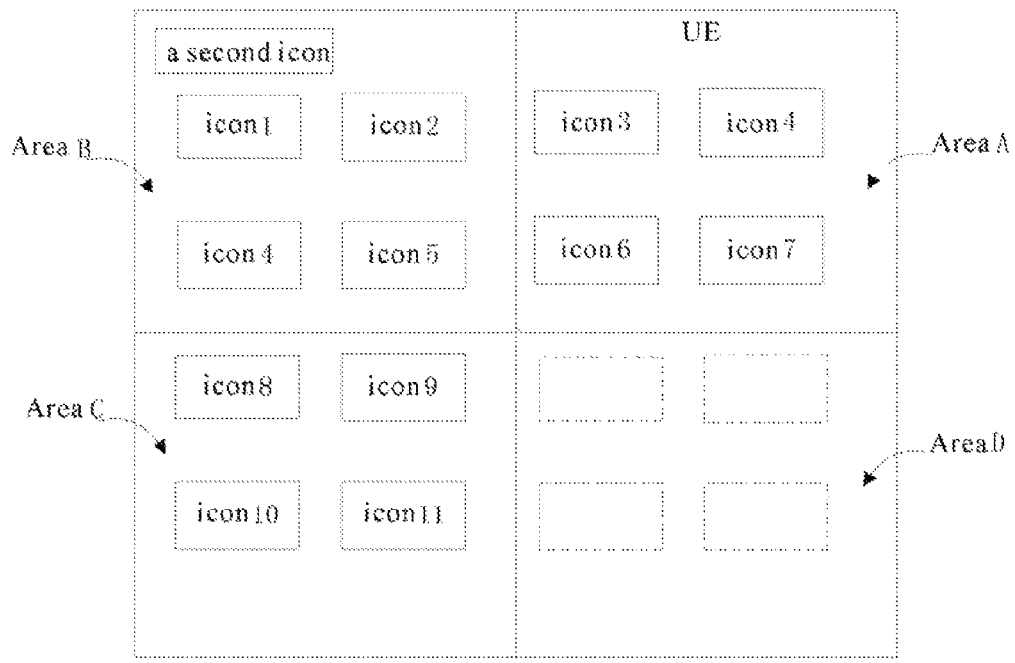
FIG. 6 is a diagram showing a displaying interface of a UE according to the second embodiment of the invention.

In specific implementation, the second icon may be created and displayed at an edge of the area in which the first icon is located. In the embodiment, the second icon may be an icon in a form of a waste bin. As shown in FIG. 6, the second icon is displayed in the area B of the display interface in which the first icon is located.

At step 204, a moving trace generated when the user drags the first icon is monitored, and the first icon is controlled to move along the moving trace.

At step 205, when the first icon moves to a position of the second icon, the user is prompted whether to delete the application program corresponding to the first icon. In the embodiment, the user may be prompted whether to delete the application program corresponding to the first icon by popping up a prompt box.

At step 206, when the user selects to delete the application program corresponding to the first icon, the application program corresponding to the first icon is deleted by the application program corresponding to the second icon.

Specifically, the application program corresponding to the first icon may be deleted by the application program corresponding to the second icon as follows.

Firstly, it is determined whether the application program corresponding to the first icon is a third party application program or a local system program. The third party application program herein refers to an application program which is not programmed officially and can be installed or uninstalled in the UE. Correspondingly, the local system program is an officially programmed application program, which is not allowed to be amended or deleted.

When the application program corresponding to the first icon is a third party application program, the application program corresponding to the first icon is deleted by the application program corresponding to the second icon.

When the application program corresponding to the first icon is a local system program, the application program corresponding to the first icon is not allowed to be deleted and a prompt is provided to the user by popping up a prompt box in the display area of the screen.

Herein, whether the application program corresponding to the first icon is a third party application program or a local system program may be determined as below.

An amending authority for the application program corresponding to the first icon is read out. When the amending authority indicates that it is allowed to amend the application program corresponding to the first icon, it is determined that the application program corresponding to the first icon is a third party application program. Otherwise, when the amending authority indicates that it is not allowed to amend the application program corresponding to the first icon, it is determined that the application program corresponding to the first icon is a local system program.

Alternatively, a local system program catalogue may be searched according to the application program corresponding to the first icon. When the local system program catalogue does not include the application program corresponding to the first icon, it is determined that the application program corresponding to the first icon is a third party application program. Otherwise, when the local system program catalogue includes the application program corresponding to the first icon, it is determined that the application program corresponding to the first icon is a local system program.

Herein, the application program corresponding to the first icon may be deleted by the application program corresponding to the second icon as follows.

The application program corresponding to the first icon is locally deleted by the application program corresponding to the second icon.

Alternatively, the application program corresponding to the first icon may be isolated into the application program corresponding to the second icon.

It is noted that, in specific implementation of the embodiment, when the first icon is moved to the position of the second icon, the application program corresponding to the first icon may be deleted directly by the application program corresponding to the second icon without prompting the user whether to delete the application program corresponding to the first icon.

In the embodiment, the area of the first icon in the displaying interface is determined, the second icon is displayed in the determined area, and the application program corresponding to the first icon is deleted by using the application program corresponding to the second icon when the first icon moves to the position of the second icon. Since the first icon and the second icon are displayed in the same area, the distance for moving the first icon to the position of the second icon so as to delete the application program corresponding to the first application will not be too long for operation.

Embodiment III

Figure 7:
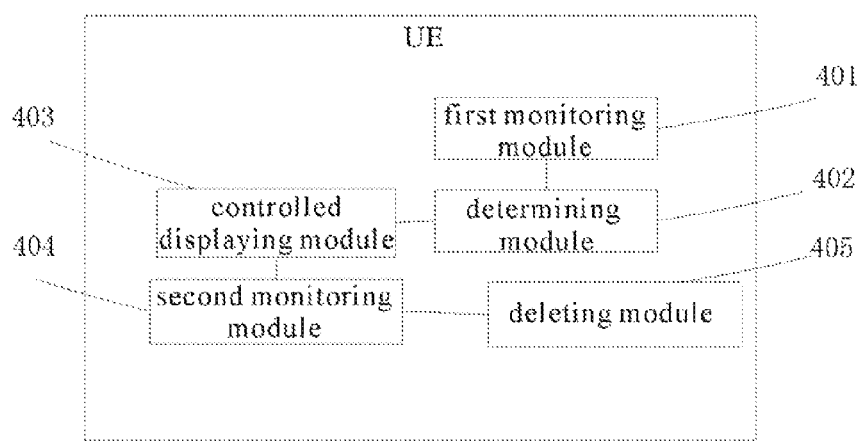
FIG. 7 is a structural diagram showing a UE according to a third embodiment of the invention.

Referring to FIG. 7, a UE may comprise a first monitoring module 301, a determining module 302, a controlled displaying module 303, a second monitoring module 304 and a deleting module 305.

The first monitoring module 301 is configured to monitor a touch event generated when a user touches an icon displayed on a displaying interface.

The determining module 302 is configured to determine an area of the first icon in the displaying interface when a touch event corresponding to a first icon is monitored and the monitored event lasts for a predetermined period.

The controlled displaying module 303 is configured to display a second icon in the determined area.

The second monitoring module 304 is configured to monitor a moving trace generated when the user drags the first icon and control the first icon to move along the moving trace.

The deleting module 305 is configured to delete the application program corresponding to the first icon by using the application program corresponding to the second icon when the first icon moves to a position of the second icon.

Figure 8:
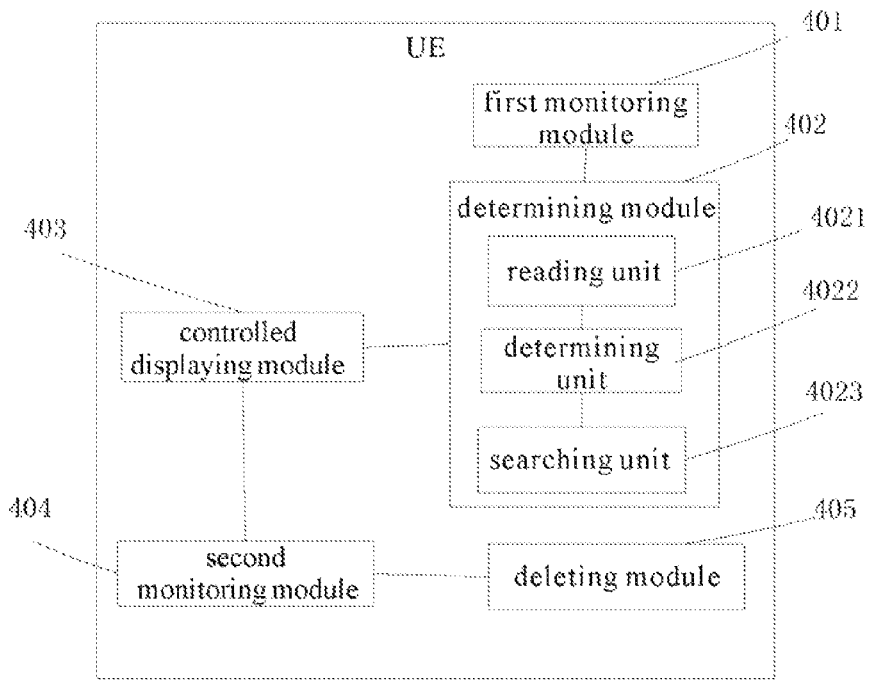
FIG. 8 is a structural diagram showing a UE according to the third embodiment of the invention.

Further, referring to FIG. 8, the determining module 302 of FIG. 7 may comprise the following units.

A reading unit 3021 is configured to read out position information of the first icon in the display interface.

A determining unit 3022 is configured to determine the coordinate of the center of the first icon according to the position information.

A searching unit 3023 is configured to search corresponding relationship between areas in the display interface and the coordinate intervals according to the determined coordinate of the center of the first icon so as to obtain an area in which the coordinate is located. The searched out area is the area of the display interface in which the first icon is located.

Figure 9:
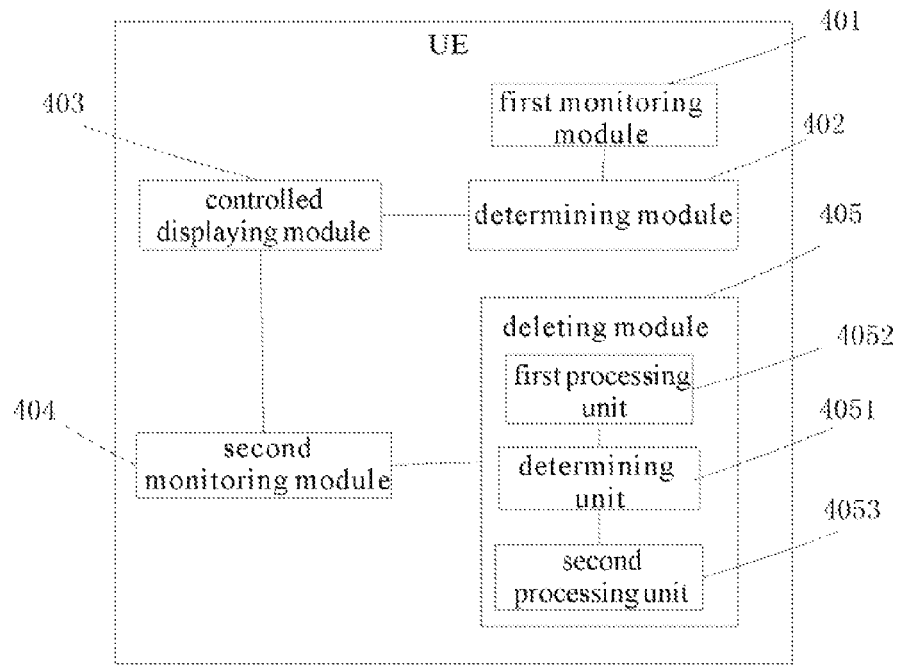
FIG. 9 is a structural diagram showing a UE according to the third embodiment of the invention.

Further, referring to FIG. 9, the deleting module 305 of FIG. 7 may comprise the following units.

A determining unit 3051 is configured to determine whether the application program corresponding to the first icon is a third party application program or a local system program.

A first processing unit 3052 is configured to delete the application program corresponding to the first icon by the application program corresponding to the second icon when the application program corresponding to the first icon is a third party application program.

A second processing unit 3053 is configured to prevent deleting the application program corresponding to the first icon by the application program corresponding to the second icon and provide a prompt to the user when the application program corresponding to the first icon is a local system program.

Specifically, the determining unit 3051 reads out an amending authority for the application program corresponding to the first icon. When the amending authority indicates that it is allowed to amend the application program corresponding to the first icon, it is determined that the application program corresponding to the first icon is a third party application program. Otherwise, when the amending authority indicates that it is not allowed to amend the application program corresponding to the first icon, it is determined that the application program corresponding to the first icon is a local system program.

Alternatively, the determining unit 3051 may search a local system program catalogue according to the application program corresponding to the first icon. When the local system program catalogue does not include the application program corresponding to the first icon, it is determined that the application program corresponding to the first icon is a third party application program. Otherwise, when the local system program catalogue includes the application program corresponding to the first icon, it is determined that the application program corresponding to the first icon is a local system program.

Specifically, the first processing unit 3052 may locally delete the application program corresponding to the first icon by the application program corresponding to the second icon.

Alternatively, the first processing unit 3052 may isolate the application program corresponding to the first icon into the application program corresponding to the second icon.

In the embodiment, the area of the first icon in the displaying interface is determined, the second icon is displayed in the determined area, and the application program corresponding to the first icon is deleted by using the application program corresponding to the second icon when the first icon moves to the position of the second icon. Since the first icon and the second icon are displayed in the same area, the distance for moving the first icon to the position of the second icon so as to delete the application program corresponding to the first application will not be too long for operation.

It is noted that the above embodiments are described according to various functional modules when the UE manages the application program as an example. In practice, the above described functional modules may be implemented by different modules as required, i.e., to divide the internal structure of the UE being into different functional modules, to perform some or all of the above described functions. In addition, the UE and the method for managing the application program described above belong to a same concept. The detailed implementation of the UE may refer to the embodiments of the method and thus is omitted here.

Embodiment IV

Figure 10:
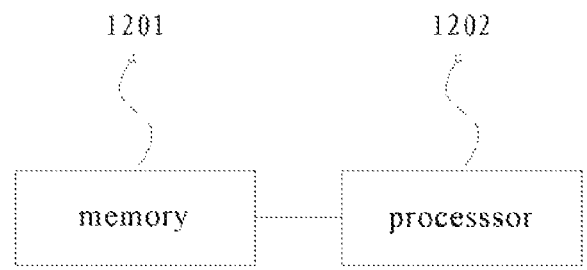
FIG. 10 is a structural diagram showing a terminal according to a fourth embodiment of the invention.

According to the embodiment, a terminal as shown in FIG. 10 is provided.

The terminal 1200 comprises a memory 1201 and at least one processor 1202. The memory 1201 stores software programs and modules, such as program instructions and modules corresponding to the system desktop of embodiments of the disclosure, and data generated when implementing the management of application program according to the embodiment. The processor 1202 performs various functional application and data processing, i.e., implements functions for managing the application program according to the embodiment, by executing the software programs and modules stored in the memory 1201.

Herein, the processor 1202 is configured to perform the following operations for managing the application program:

monitoring a touch event generated when a user touches an icon displayed on a displaying interface;

determining an area of the first icon in the displaying interface when a touch event corresponding to a first icon is monitored and the monitored event lasts for a predetermined period;

displaying a second icon in the determined area;

monitoring a moving trace generated when the user drags the first icon and controlling the first icon to move along the moving trace;

deleting the application program corresponding to the first icon by using the application program corresponding to the second icon when the first icon moves to a position of the second icon.

Herein, determining an area of the first icon in the displaying interface comprises:

reading out position information of the first icon in the display interface;

determining a coordinate of a center of the first icon according to the position information;

searching corresponding relationship between areas in the display interface and coordinate intervals according to the determined coordinate of the center of the first icon so as to obtain an area in which the coordinate is located, the searched out area being the area of the display interface in which the first icon is located.

Herein, deleting the application program corresponding to the first icon by using the application program corresponding to the second icon comprises:

determining whether the application program corresponding to the first icon is a third party application program or a local system program;

deleting the application program corresponding to the first icon by the application program corresponding to the second icon when the application program corresponding to the first icon is a third party application program;

preventing deleting the application program corresponding to the first icon by the application program corresponding to the second icon and providing a prompt to the user when the application program corresponding to the first icon is a local system program.

Herein, determining whether the application program corresponding to the first icon is a third party application program or a local system program comprises:

reading out an amending authority for the application program corresponding to the first icon, determining that the application program corresponding to the first icon is a third party application program if the amending authority indicates that it is allowed to amend the application program corresponding to the first icon, and determining that the application program corresponding to the first icon is a local system program if the amending authority indicates that it is not allowed to amend the application program corresponding to the first icon; or searching a local system program catalogue according to the application program corresponding to the first icon, determining that the application program corresponding to the first icon is a third party application program if the local system program catalogue does not include the application program corresponding to the first icon, and determining that the application program corresponding to the first icon is a local system program if the local system program catalogue includes the application program corresponding to the first icon.

Herein, deleting the application program corresponding to the first icon by using the application program corresponding to the second icon comprises:

locally deleting the application program corresponding to the first icon by the application program corresponding to the second icon; or isolating the application program corresponding to the first icon into the application program corresponding to the second icon.

Figure 11:
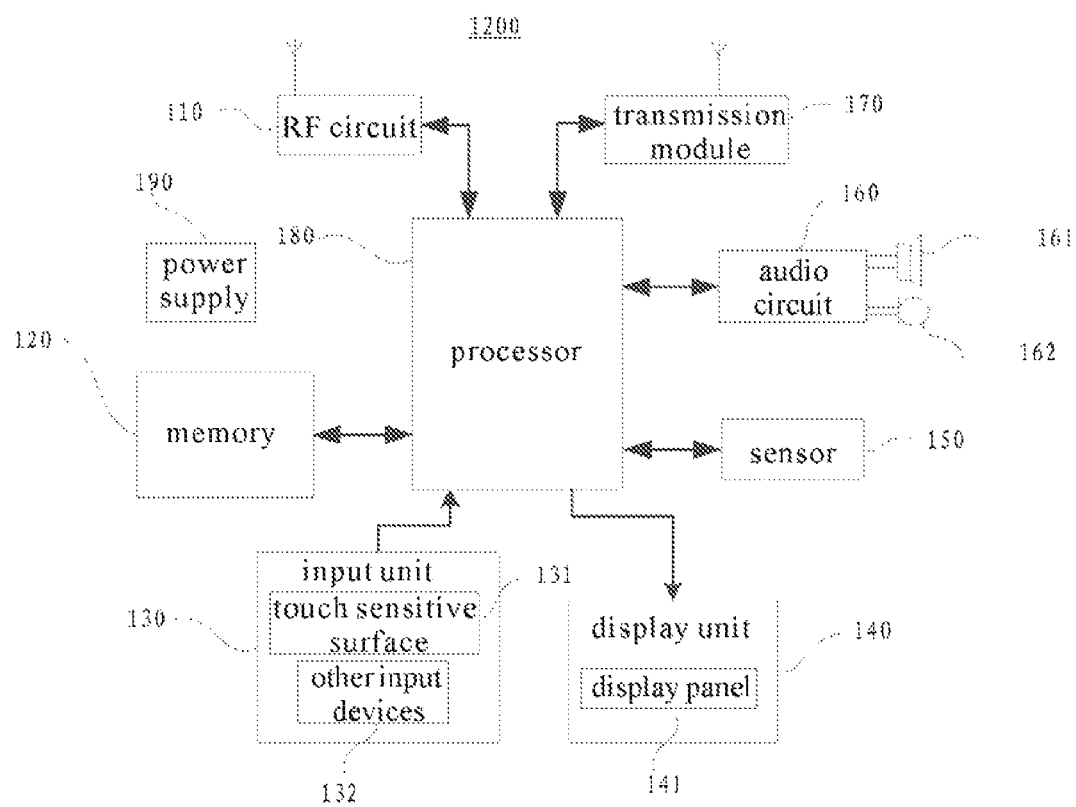
FIG. 11 is a structural diagram showing a terminal according to the fourth embodiment of the invention.

Preferably, as shown in FIG. 11, the terminal 1200 also comprises the following units:

an RF (Radio Frequency) circuit 110, one or more memories 120 formed by computer readable storage media, an input unit 130, a display unit 140, a sensor 150, an audio circuit 160, a transmission module 170, one or more central processor 180, a power supply 190 and etc.

Person skilled in the art will appreciate that the structure of the terminal shown in FIG. 7 puts no limitation to the terminal, which may include more or less components, or combination of the components, or different arrangements of the components.

Herein, the RF circuit 110 may be used for signal reception and transmission in transceiving or communicating procedure. In particular, the RF circuit 110 may send downlink information received from a base station to one or more processors 180 and send uplink related data to the base station. Usually, the RF circuit 110 includes, but is not limited to, an antenna, at least one amplifier, a tuner, one or more oscillators, a SIM card, a transceiver, a coupler, an LNA (Low Noise Amplifier), a duplexer, and etc. Further, the RF circuit 110 may be implemented by communication with other devices through wireless communication and network. The wireless communication may use any one of communication standards or protocols, including but not limiting to: GSM (Global System of Mobile communication), GPRS (General Packet Radio Service), CDMA (Code Division Multiple Access), WCDMA (Wideband Code Division Multiple Access), LTE (Long Term Evolution), E-mailing, SMS (Short Messaging Service), and etc.

The memory 120 may be used for storing software programs and modules (such as, software programs and modules for managing applications in the embodiments of the invention), and data generated in the implementation of managing applications for implementing the embodiments. The processor 180 performs various functional applications and data processing by running software programs stored in the memory 120, so as to manage applications. The memory 120 may mainly comprise a program storing area and a data storing area, wherein the program storing area may store an operating system, at least one required application (such as, audio play function, video play function, and etc.), and the data storing area may store data (such as, audio data, phone directory, and etc.) generated by using the terminal and other data. Further, the memory 120 may include a cache memory, and may also include a non-volatility memory, such as at least one disk memory, a flash, or other volatility solid state storages. Accordingly, the memory 120 may also include a memory controller so as to provide an access from the processor 180 and the input unit 130 to the memory 120.

The input unit 130 is configured to receive input numeral or character information and generate input from a keyboard, a mouse, a controlling rod, an optical or trace ball related to the user's setting and functional control. In particular, the input unit 130 may include a touch sensitive surface 131 and other input devices 132. The touch sensitive surface 131, also named a touch display screen or a touch control pad, collects touch operations of the user on or near the surface itself (e.g., a user operates on or near the touch sense surface 131 by using a finger, a touch pen, and any other suitable object or attachment), and actuates corresponding connecting means according to a preset program. Optionally, the touch sense surface 131 may include a touch detecting device and a touch controller, wherein the touch detecting device detects a touch orientation of the user, detects signals generated by the touch operation, and sends the signals to the touch controller; and the touch controller receives touch information from the touch detecting device, transforms the touch information into touch point coordinates, sends them to the processor 180, and receives and executes commands sent from the processor 180. Additionally, the touch sense surface 131 may be implemented as a resistive, capacitive or infra-red surface or surface acoustic wave and etc. Besides the touch sense surface 131, the input unit 130 may further include other input devices 132. In particular, the other input devices 132 may include (but not limited to) one or more of the following: a physical keyboard, functional keys (such as, audio volume control button, switch button, and etc.), a trace ball, a mouse, a controlling rod.

The display unit 140 displays information input by the user or information provided to the user, as well as various graphical user interfaces (GUIs) of the terminal 1200, wherein these GUIs are composed of a graph, a text, an icon, a video or a combination thereof. The display unit 140 may comprise a display panel 141. Optionally, the display panel 141 may be configured as an LCD (Liquid Crystal Display), an OLED (Organic Light-Emitting Diode), and etc. Furthermore, the touch sensitive surface 131 may cover the display panel 141. After the touch sensitive surface 131 has detected a touch operation on or near the display panel 141, the detecting result is sent to the processor 180 to determine the type of a touch event, and then the processor 180 commands the display panel 141 to present corresponding visual output according to the type of the touch event. Although the touch sense surface 131 and the display panel 141 act are shown in FIG. 8 as two independent components to perform input and output, in some embodiments, the touch sense surface 131 and the display panel 141 may be integrated as a signal unit to perform the input and output functions.

The terminal 1200 may further include at least one sensor 150, such as, an optical sensor, a motion sensor, and other sensors. In particular, the optical sensor may include an ambient light sensor and a proximity sensor, wherein the ambient light sensor adjusts the brightness of the display panel 141 according to ambient light, and the proximity sensor may switch off the display panel 141 and/or background light when the terminal 1200 moves close to an ear of the user. As one kind of motion sensors, a gravity acceleration sensor may detect the amplitude of an acceleration in various directions (usually three axes), detect the amplitude and the direction of the gravity when the terminal is stationary, and be used for identifying the gesture of the phone (such as, a switch between horizontal screen and vertical screen, a related game, calibration of the gesture of the magnetometer) and for identifying vibration (such as, pedometer, knocking) and etc. The terminal 1200 may also be configured to accommodate a gyroscope, a barometer, a hygrometer, a thermometer, an infra-red sensor, and other sensors, the description of which are omitted here.

An audio circuit 160, a speaker 161, a microphone 162 may provide audio interface between the user and the terminal 1200. The audio circuit 160 transforms received audio data into an electrical signal, which is then transmitted to the speaker 161 for outputting the electrical signal. On the other hand, the microphone 162 transforms collected sound signal into an electrical signal, which is then received by the audio circuit 160 and is transformed into audio data, wherein the audio data is output to the processor 180 for processing. Then, the processed audio data is for example sent to another terminal via the RF circuit 110, or is sent to the memory 120 for further processing. The audio circuit 160 may further include an earphone plug so as to provide communication between an earphone and the terminal 1200.

WiFi is a short distance wireless transmission technology. The terminal 1200 may facilitate the user to transmit/receive an e-mail, browse a website, access streaming media and etc. through a WiFi module 170 which provides the user with a wireless access to the broadband Internet. Although the WiFi module 170 is shown in FIG. 8, it is appreciated that it is not a necessary composition of the terminal 1200. That is, the WiFi module may be omitted according to actual needs without varying the essence of the invention.

The processor 180 is the control center of the terminal 1200, which utilizes various interfaces and connections for connecting various components of the terminal (such as a cell phone), executes various functions of the terminal 1200 and processes data by performing or implementing software programs and/or modules stored in the memory 120 so as to monitor the whole cell phone functions. Optionally, the processor 180 may include one or more processing cores. Preferably, the processor 180 may integrate an application processor and a modem processor, wherein the application processor mainly operates the operating system, user interfaces, and application programs, and the modem processor mainly operates wireless communication. It is also appreciated that the modem processor may also be not integrated into the processor 180.

The terminal 1200 may further include a power supply 190 (such as, a battery) for powering various components. Preferably, the power supply 190 may be logically connected to the processor 180 via a power supply management system so that the charging, discharging, power consumption or the like may be managed by the power source management system. The power supply 190 may include one or more DC or AC power supplies, a re-charging system, a power fault detection circuit, a power converter or inverter, a power status indicator and etc.

Although not shown, the terminal 1200 may also include a camera, a Bluetooth module and etc, which are omitted here.

In this embodiment, a terminal is provided, in which the area of the first icon in the displaying interface is determined, the second icon is displayed in the determined area, and the application program corresponding to the first icon is deleted by using the application program corresponding to the second icon when the first icon moves to the position of the second icon. Since the first icon and the second icon are displayed in the same area, the distance for moving the first icon to the position of the second icon so as to delete the application program corresponding to the first application will not be too long for operation.

Embodiment V

A readable storing medium is provided in this embodiment. The readable storing medium may be a readable storing medium included in the memory of the above described embodiment, or a separate computer readable storing medium which has not been assembled in the terminal. One or more programs may be stored in the computer readable storing medium and executed by one or more processors for implementing a method for managing an application program. The method comprises the following steps:

monitoring a touch event generated when a user touches an icon displayed in a displaying interface;

determining an area of the first icon in the displaying interface when a touch event corresponding to a first icon is monitored and the monitored event lasts for a predetermined period;

displaying a second icon in the determined area;

monitoring a moving trace generated when the user drags the first icon and controlling the first icon to move along the moving trace; and deleting the application program corresponding to the first icon by using the application program corresponding to the second icon when the first icon moves to a position of the second icon.

Herein, determining an area of the first icon in the displaying interface comprises:

reading out position information of the first icon in the display interface;

determining a coordinate of a center of the first icon according to the position information;

searching corresponding relationship between areas in the display interface and coordinate intervals according to the determined coordinate of the center of the first icon so as to obtain an area in which the coordinate is located, the searched out area being the area of the display interface in which the first icon is located.

Herein, deleting the application program corresponding to the first icon by using the application program corresponding to the second icon comprises:

determining whether the application program corresponding to the first icon is a third party application program or a local system program;

deleting the application program corresponding to the first icon by the application program corresponding to the second icon when the application program corresponding to the first icon is a third party application program;

preventing deleting the application program corresponding to the first icon by the application program corresponding to the second icon and providing a prompt to the user when the application program corresponding to the first icon is a local system program.

Herein, determining whether the application program corresponding to the first icon is a third party application program or a local system program comprises:

reading out an amending authority for the application program corresponding to the first icon, determining that the application program corresponding to the first icon is a third party application program if the amending authority indicates that it is allowed to amend the application program corresponding to the first icon, and determining that the application program corresponding to the first icon is a local system program if the amending authority indicates that it is not allowed to amend the application program corresponding to the first icon; or searching a local system program catalogue according to the application program corresponding to the first icon, determining that the application program corresponding to the first icon is a third party application program if the local system program catalogue does not include the application program corresponding to the first icon, and determining that the application program corresponding to the first icon is a local system program if the local system program catalogue includes the application program corresponding to the first icon.

Herein, deleting the application program corresponding to the first icon by using the application program corresponding to the second icon comprises:

locally deleting the application program corresponding to the first icon by the application program corresponding to the second icon; or isolating the application program corresponding to the first icon into the application program corresponding to the second icon.

In this embodiment, a readable storing medium is provided, in which the area of the first icon in the displaying interface is determined, the second icon is displayed in the determined area, and the application program corresponding to the first icon is deleted by using the application program corresponding to the second icon when the first icon moves to the position of the second icon. Since the first icon and the second icon are displayed in the same area, the distance for moving the first icon to the position of the second icon so as to delete the application program corresponding to the first application will not be too long for operation.

The numbers of the above described embodiments are used only for the purpose of description, but not represent preference of the embodiments.

It is anticipated for an ordinary person in the art that all or some of steps in the above embodiments may be implemented by hardware or a program for instructing related hardware. The program may be stored in a computer readable storing medium which may be a read-only memory, a magnetic disk or an optical disk.

The above described embodiments are merely preferred embodiments of the invention, but not intended to limit the invention. Any modifications, equivalent alternations and improvements that are made within the spirit and scope of the invention should be included in the protection scope of the invention.

What is claimed is:

1. A method for managing a plurality of application programs, comprising:
    monitoring a first touch event generated when a first icon corresponding to a first application program displayed in a displaying interface is touched, wherein the displaying interface is divided into a plurality of non-overlapping areas;
    determining a first area in which the first icon is located among the plurality of areas when the first touch event corresponding to the first icon is monitored and lasts for a predetermined period;
    in response to the first touch event, displaying a second icon within the first area;
    monitoring a moving trace generated when the first icon is dragged and controlled to move along the moving trace;
    deleting the first application program corresponding to the first icon and removing the first icon from the first area of the displaying interface when the first icon moves to a position of the second icon within the first area;
    detecting a second touch event when a third icon corresponding to a second application program displayed in the display interface is touched and the second touch event lasts for the predetermined period;
    determining a second area in which the third icon is located among the plurality of areas, the second area being distinct from the first area;
    in response to the second touch event, displaying the second icon within the second area; and
    in response to a detection of a second moving trace indicating that the third icon moves to a second position of the second icon within the second area, deleting the second application program and removing the third icon from the second area of the displaying interface.

2. The method according to claim 1, wherein determining the first area of the first icon in the displaying interface comprises:
    reading out position information of the first icon in the display interface;
    determining a coordinate of a center of the first icon according to the position information; and
    searching for a corresponding relationship between areas in the display interface and coordinate intervals according to the determined coordinate of the center of the first icon so as to obtain an area in which the coordinate is located, wherein the area in which the coordinate is located is the first area of the display interface in which the first icon is located.

3. The method according to claim 1, wherein deleting the first application program corresponding to the first icon comprises:
    determining whether the first application program corresponding to the first icon is a third party application program or a local system program;
    deleting the first application program corresponding to the first icon when the first application program corresponding to the first icon is a third party application program; and
    preventing deleting the first application program corresponding to the first icon and providing a prompt to the user when the first application program corresponding to the first icon is a local system program.

4. The method according to claim 3, wherein determining whether the first application program corresponding to the first icon is a third party application program or a local system program comprises:
    reading out an amending authority for the first application program corresponding to the first icon, determining that the first application program corresponding to the first icon is a third party application program if the amending authority indicates that it is allowed to amend the first application program corresponding to the first icon, and determining that the first application program corresponding to the first icon is a local system program if the amending authority indicates that it is not allowed to amend the first application program corresponding to the first icon; or
    searching a local system program catalogue according to the first application program corresponding to the first icon, determining that the first application program corresponding to the first icon is a third party application program if the local system program catalogue does not include the first application program corresponding to the first icon, and determining that the first application program corresponding to the first icon is a local system program if the local system program catalogue includes the first application program corresponding to the first icon.

5. The method according to claim 1, wherein deleting the first application program corresponding to the first icon comprises:
    locally deleting the first application program corresponding to the first icon by an application program corresponding to the second icon; or isolating the first application program corresponding to the first icon from the application program corresponding to the second icon.

6. A terminal comprising:
a memory;
one or more programs stored in the memory and configured to be executed by one or more processors, the one or more programs including instructions for performing operations of:
monitoring a first touch event generated when a first icon corresponding to a first application program displayed in a displaying interface is touched, wherein the displaying interface is divided into a plurality of non-overlapping areas;
determining a first area in which the first icon is located among the plurality of areas when the first touch event corresponding to the first icon is monitored and lasts for a predetermined period;
in response to the first touch event, displaying a second icon within the first area;
monitoring a moving trace generated when the first icon is dragged and controlled to move along the moving trace;
deleting the first application program corresponding to the first icon and removing the first icon from the first area of the displaying interface when the first icon moves to a position of the second icon within the first area;
detecting a second touch event when a third icon corresponding to a second application program displayed in the display interface is touched and the second touch event lasts for the predetermined period;
determining a second area in which the third icon is located among the plurality of areas, the second area being distinct from the first area;
in response to the second touch event, displaying the second icon within the second area; and
in response to a detection of a second moving trace indicating that the third icon moves to a second position of the second icon within the second area, deleting the second application program and removing the third icon from the second area of the displaying interface.

7. The terminal according to claim 6, wherein determining the first area of the first icon in the displaying interface comprises:
reading out position information of the first icon in the display interface;
determining a coordinate of a center of the first icon according to the position information; and
searching for a corresponding relationship between areas in the display interface and coordinate intervals according to the determined coordinate of the center of the first icon to obtain an area in which the coordinate is located, wherein the area in which the coordinate is located is the first area of the display interface in which the first icon is located.

8. The terminal according to claim 6, wherein deleting the first application program corresponding to the first icon comprises:
determining whether the first application program corresponding to the first icon is a third party application program or a local system program;

deleting the first application program corresponding to the first icon when the first application program corresponding to the first icon is a third party application program; and
preventing deleting the first application program corresponding to the first icon and providing a prompt to the user when the first application program corresponding to the first icon is a local system program.

9. The terminal according to claim 8, wherein determining whether the first application program corresponding to the first icon is a third party application program or a local system program comprises:
reading out an amending authority for the first application program corresponding to the first icon, determining that the first application program corresponding to the first icon is a third party application program if the amending authority indicates that it is allowed to amend the first application program corresponding to the first icon, and determining that the first application program corresponding to the first icon is a local system program if the amending authority indicates that it is not allowed to amend the first application program corresponding to the first icon; or
searching a local system program catalogue according to the first application program corresponding to the first icon, determining that the first application program corresponding to the first icon is a third party application program if the local system program catalogue does not include the first application program corresponding to the first icon, and determining that the first application program corresponding to the first icon is a local system program if the local system program catalogue includes the first application program corresponding to the first icon.

10. The terminal according to claim 6, wherein deleting the first application program corresponding to the first icon comprises:
locally deleting the first application program corresponding to the first icon by an application program corresponding to the second icon; or
isolating the first application program corresponding to the first icon from the application program corresponding to the second icon.

11. A non-transitory computer readable storing medium storing one or more programs, the one or more programs stored being configured to be executed by one or more processors for implementing a method for managing a plurality of application programs, the method comprising:
monitoring a first touch event generated when a first icon corresponding to a first application program displayed in a displaying interface is touched, wherein the displaying interface is divided into a plurality of non-overlapping areas;
determining a first area in which the first icon is located among the plurality of areas when the first touch event corresponding to the first icon is monitored and lasts for a predetermined period;
in response to the first touch event, displaying a second icon within the first area;
monitoring a moving trace generated when the first icon is dragged and controlled to move along the moving trace;
deleting the first application program corresponding to the first icon and removing the first icon from the first area of the displaying interface when the first icon moves to a position of the second icon within the first area;

detecting a second touch event when a third icon corresponding to a second application program displayed in the display interface is touched and the second touch event lasts for the predetermined period;

determining a second area in which the third icon is located among the plurality of areas, the second area being distinct from the first area;

in response to the second touch event, displaying the second icon within the second area; and in response to a detection of a second moving trace indicating that the third icon moves to a second position of the second icon within the second area, deleting the second application program and removing the third icon from the second area of the displaying interface.

12. The non-transitory computer readable storing medium according to claim 11, wherein determining the first area of the first icon in the displaying interface comprises:

reading out position information of the first icon in the display interface;

determining a coordinate of a center of the first icon according to the position information; and searching for a corresponding relationship between areas in the display interface and coordinate intervals according to the determined coordinate of the center of the first icon so as to obtain an area in which the coordinate is located, wherein the area in which the coordinate is located is the first area of the display interface in which the first icon is located.

13. The non-transitory computer readable storing medium according to claim 11, wherein deleting the first application program corresponding to the first icon comprises:

determining whether the first application program corresponding to the first icon is a third party application program or a local system program;

deleting the first application program corresponding to the first icon when the first application program corresponding to the first icon is a third party application program; and preventing deleting the first application program corresponding to the first icon and providing a prompt to the user when the first application program corresponding to the first icon is a local system program.

14. The non-transitory computer readable storing medium according to claim 13, wherein determining whether the first application program corresponding to the first icon is a third party application program or a local system program comprises:

reading out an amending authority for the first application program corresponding to the first icon, determining that the first application program corresponding to the first icon is a third party application program if the amending authority indicates that it is allowed to amend the first application program corresponding to the first icon, and determining that the first application program corresponding to the first icon is a local system program if the amending authority indicates that it is not allowed to amend the first application program corresponding to the first icon; or searching a local system program catalogue according to the first application program corresponding to the first icon, determining that the first application program corresponding to the first icon is a third party application program if the local system program catalogue does not include the first application program corresponding to the first icon, and determining that the first application program corresponding to the first icon is a local system program if the local system program catalogue includes the first application program corresponding to the first icon.

15. The non-transitory computer readable storing medium according to claim 11, wherein deleting the first application program corresponding to the first icon comprises:

locally deleting the first application program corresponding to the first icon by an application program corresponding to the second icon; or isolating the first application program corresponding to the first icon from the application program corresponding to the second icon.

\* \* \* \* \*